US012628032B2

(12) United States Patent
Choi et al.

(10) Patent No.: US 12,628,032 B2
(45) Date of Patent: May 12, 2026

(54) ELECTRONIC DEVICE AND INTEGRATED CONTROL METHOD OF MLO AND R-TWT

(71) Applicant: SAMSUNG ELECTRONICS CO., LTD., Suwon-si (KR)

(72) Inventors: Junsu Choi, Suwon-si (KR); Taeyong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 333 days.

(21) Appl. No.: 18/366,614

(22) Filed: Aug. 7, 2023

(65) Prior Publication Data

US 2024/0056875 A1     Feb. 15, 2024

Related U.S. Application Data

(63) Continuation of application No. PCT/KR2023/009021, filed on Jun. 28, 2023.

(30) Foreign Application Priority Data

Aug. 12, 2022    (KR) ........................ 10-2022-0101561
Sep. 23, 2022    (KR) ........................ 10-2022-0120431

(51) Int. Cl.
*H04W 28/02*         (2009.01)
*H04W 84/12*         (2009.01)

(52) U.S. Cl.
CPC ...  *H04W 28/0268* (2013.01); *H04W 28/0257* (2013.01); *H04W 84/12* (2013.01)

(58) Field of Classification Search
CPC ......... H04W 28/0268; H04W 28/0257; H04W 84/12; H04W 28/24
See application file for complete search history.

(56) References Cited

U.S. PATENT DOCUMENTS

2021/0144637 A1     5/2021   Kwon et al.
2022/0078079 A1     3/2022   Choi et al.
                    (Continued)

FOREIGN PATENT DOCUMENTS

EP        4135464 A1 *  2/2023   ............ H04W 72/52
GB        2620223 A  *  1/2024   ............ H04W 76/15
                    (Continued)

OTHER PUBLICATIONS

Extended European Search Report dated May 19, 2025 for EP Application No. 23852733.7.

(Continued)

*Primary Examiner* — Mohammad S Anwar
(74) *Attorney, Agent, or Firm* — Nixon & Vanderhye P.C.

(57)              ABSTRACT

An electronic device according to an embodiment of the present disclosure includes: at least one wireless communication module configured to transmit and receive a wireless signal; at least one processor operatively connected to the wireless communication module; and a memory electrically connected to the processor and including instructions executable by the processor. When the instructions are executed by the processor, the processor may be configured to: receive at least one beacon signal including restricted target wake time (R-TWT) service period (SP) information of each link included in multiple links; determine at least one link from among the multiple links based on the beacon signal; and transmit and receive data based on the at least one link. Other embodiments, in addition to the foregoing embodiment, are also applicable.

20 Claims, 13 Drawing Sheets

(56)                    References Cited

U.S. PATENT DOCUMENTS

2022/0116833 A1      4/2022  Fang et al.
2023/0026249 A1*    1/2023  Chu  .................. H04W 28/0268

FOREIGN PATENT DOCUMENTS

KR          10-2029330 B1    10/2019
KR          10-2167885 B1    10/2020
KR      10-2022-0022873 A      2/2022
WO      WO 2022/158802 A1     7/2022

OTHER PUBLICATIONS

Binita Gupta (Meta): "CR—QoS characteristics with rTWT setup",
IEEE Draft; 11-22-0034-01-00BE-CR-QOS-Characteristics-
WITHRTWT-Setup, IEEE-SA Mentor, Piscataway, NJ USA
(XP068189923).
International Search Report for PCT/KR2023/009021 by Korean
Intellectual Property Office dated Sep. 19, 2023.
Shafin, Rubayet et al. "Resolution for CIDs in CC36", IEEE
802.11-22/0254r7, May 16, 2022.
Gupta, Binita et al. "Delivering QoS Characteristics element with
Restricted TWT setup", IEEE 802.11-22/0034r2, May 10, 2022.
Hu, Chunyu et al. "LB 266 Resolution for misc CIDs related to
r-TWT", IEEE 802. 11-22/1098r4, Jul. 14, 2022.
Guo, Jason Yuchen et al. "CR for rTWT TXOP rules", IEEE
802.11-22/0139r1, Apr. 21, 2022.

* cited by examiner

601

ELECTRONIC DEVICE AND INTEGRATED CONTROL METHOD OF MLO AND R-TWT

CROSS-REFERENCE TO RELATED APPLICATIONS

This application is a continuation of International Application No. PCT/KR2023/009021 designating the United States, filed on Jun. 28, 2023, in the Korean Intellectual Property Receiving Office and claiming priority to Korean Patent Application No. 10-2022-0101561 filed on Aug. 12, 2022, and Korean Patent Application No. 10-2022-0120431 filed on Sep. 23, 2022, in the Korean Intellectual Property Office, the disclosures of which are incorporated by reference herein in their entireties.

BACKGROUND

Field

The disclosure relates to electronic devices and integrated control methods of a multi-link operation (MLO) and a restricted target wake time (R-TWT).

Description of Related Art

The advent of electronic devices such as smartphones, tablet personal computers (PCs), and laptops has brought the explosive demand for high-speed wireless connection. Such a trend and increasing demand for high-speed wireless connection has promoted the firm establishment of the Institute of Electrical and Electronics Engineers (IEEE) 802.11, a wireless communication standard, as a representative and universal high-speed wireless communication standard in the information technology (IT) industry. Early wireless local area network (WLAN) technology that was developed around 1997 supported a transmission rate of 1 to 2 megabits per second (Mbps) to the maximum. It has been steadily developed since then based on the demand for faster wireless connection, and novel WLAN technologies that improve the transmission rate, to this end, standards such as such as IEEE 802.11n, 802.11ac, and 802.11ax, have been developed. IEEE 802.11 ax, which is currently the latest version of the standard, has a maximum transmission rate of several gigabits per second (Gbps).

Currently, WLAN covers various public places such as offices, airports, stadiums, or stations in addition to private places such as homes, providing users with high-speed wireless connection throughout society. Accordingly, WLAN has had a significant impact on people's lifestyles and culture and has now become a norm in modern people's lives.

SUMMARY

According to an aspect of the present disclosure, there is provided an electronic device including: at least one wireless communication module configured to transmit and receive a wireless signal; a processor operatively connected to the wireless communication module; and a memory electrically connected to the processor and configured to store instructions executable by the processor, wherein when the instructions are executed by the processor, the processor is configured to: receive at least one beacon signal including information about restricted target wake time (R-TWT) service period (SP) of each of links included in multiple links; determine at least one link from among the multiple links, based on the beacon signal; and transmit and receive data based on the at least one link. The R-TWT SP may be dynamically configured based on a Quality of Service (QoS) requirement different for each type of service to be executed in a peripheral device including the electronic device.

According to an aspect of the present disclosure, there is provided a method of operating an electronic device, the method including: receiving at least one beacon signal including information about the R-TWT SP of each of links included in multiple links; determining at least one link from among the multiple links based on the beacon signal; and transmitting and receiving data based on the at least one link. The R-TWT SP may be dynamically configured based on a QoS requirement different for each type of service to be executed in a peripheral device including the electronic device.

DETAILED DESCRIPTION

Figure 1:
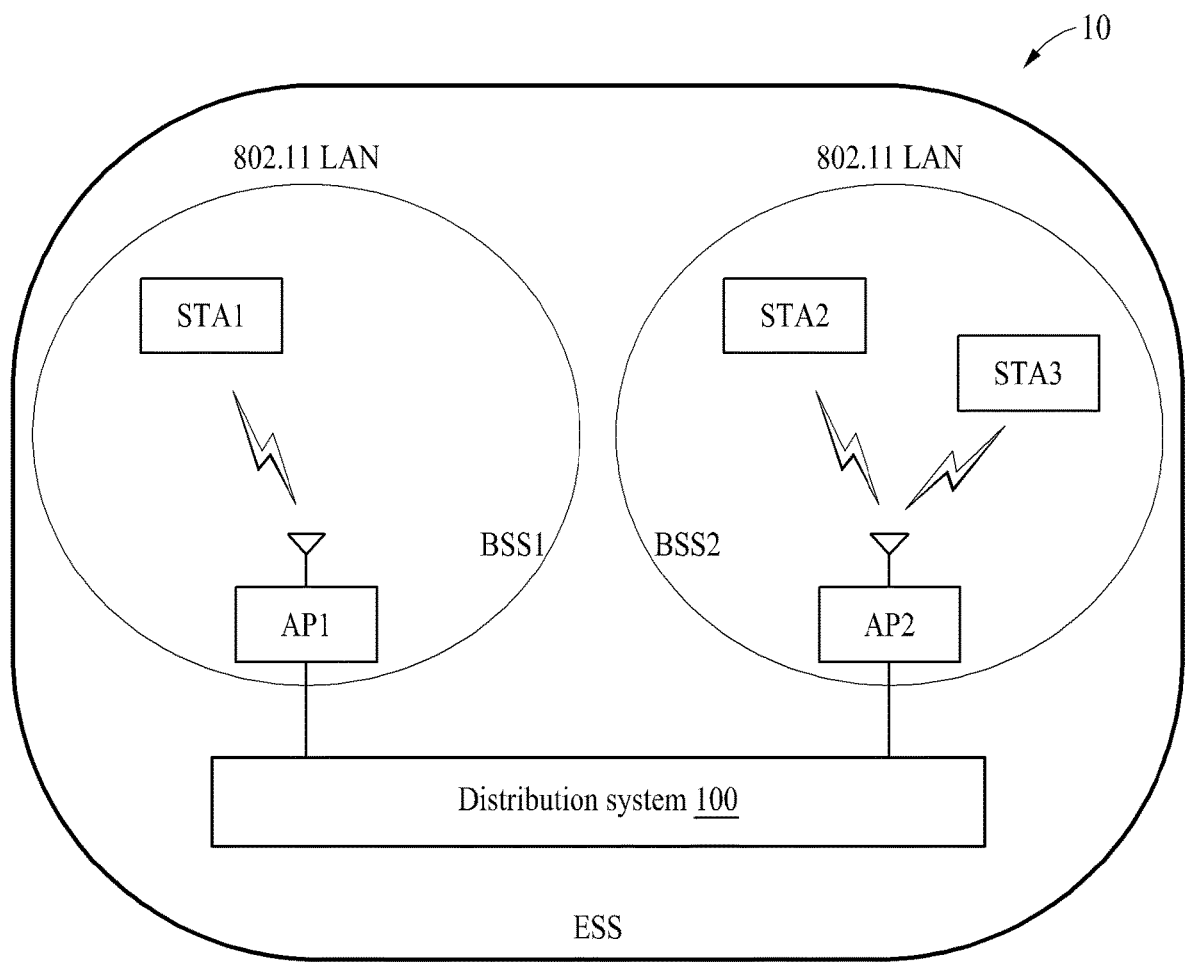
FIG. 1 is a diagram illustrating an example wireless local area network (WLAN) system according to an embodimentan embodiment of the present disclosure.

Hereinafter, an example embodiment will be described in detail with reference to the accompanying drawings. When describing the embodiments with reference to the accompanying drawings, like reference numerals refer to like elements and a repeated description related thereto will be omitted.

FIG. 1 is a diagram illustrating an example wireless local area network (WLAN) system according to an embodimentan embodiment of the present disclosure.

Referring to FIG. 1, according to an embodiment, a WLAN system 10 may represent an infrastructure mode that includes an access point (AP) in a WLAN structure conforming to IEEE 802.11, a standard of the Institute of Electrical and Electronic Engineers (IEEE). The WLAN system 10 may include at least one basic service set (BSS), for example, BSS1 and BSS2. The BSS (e.g., BSS1 and BSS2) may be a set of an access point (AP) and a station (STA) (e.g., an electronic device 1301, 1302, or 1304 of FIG. 13) that may synchronize with each other to communicate with each other. BSS1 may include AP1 and STA1, and BSS2 may include AP2, STA2, and STA3.

According to an embodiment, the WLAN system 10 may include at least one STA (e.g., STA1 to STA3), a plurality of APs (e.g., AP1 and AP2) providing a distribution service, and a distribution system 100 connecting the APs (e.g., AP1 and AP2). The distribution system 100 may implement an extended service set (ESS) by connecting a plurality of BSSs (e.g., BSS 1 and BSS 2). The ESS may be used as a term denoting a single network that is formed as a plurality of APs (e.g., AP1 and AP2) are connected via the distribution system 100. A plurality of APs (e.g., AP1 and AP2) included in a single ESS may have the same service set identifier (SSID).

According to an embodiment, an STA (e.g., STA1 to STA3) may be an arbitrary functional medium including a physical layer interface for medium access control (MAC) and wireless media, which conforms to the IEEE 802.11 standards. The term STA used herein may encompass both AP and non-AP STA. The STA (e.g., STA1 to STA3) may also be referred to as, for example, an electronic device, a mobile terminal, a wireless device, a wireless transmit/receive unit (WTRU), user equipment (UE), a mobile station (MS), and a mobile subscriber unit, or may simply referred to as a user.

Figure 2:
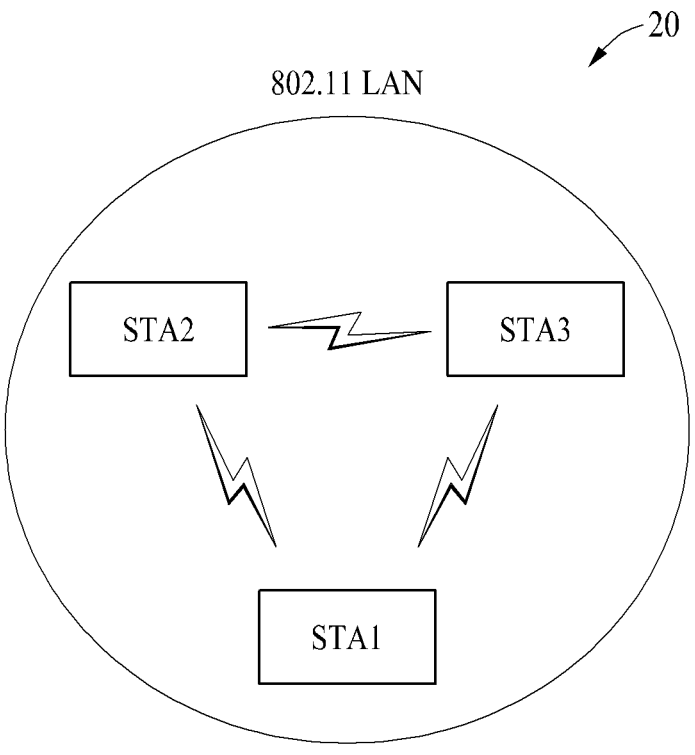
FIG. 2 is a diagram illustrating an example WLAN system according to an embodimentan embodiment of the present disclosure.

FIG. 2 is a diagram illustrating an example WLAN system according to an embodiment of the present disclosure.

Referring to FIG. 2, according to an embodiment, a WLAN system 20 may represent an ad-hoc mode that sets a network between a plurality of STAs without an AP in a WLAN structure conforming to the IEEE 802.11 standards and allows them to communicate, unlike the WLAN system 10 of FIG. 1. The WLAN system 20 may include a BSS that operates in the ad-hoc mode, i.e., an independent BSS (IBSS).

According to an embodiment, an IBSS may not include an AP, and there may thus be no centralized management entity that performs a management function at a center. In the IBSS, STAs may be managed in a distributed manner. In the IBSS, STAs may all be mobile and not be allowed to access a distribution system and may thus form a standalone network (or a self-contained network).

Figure 3:
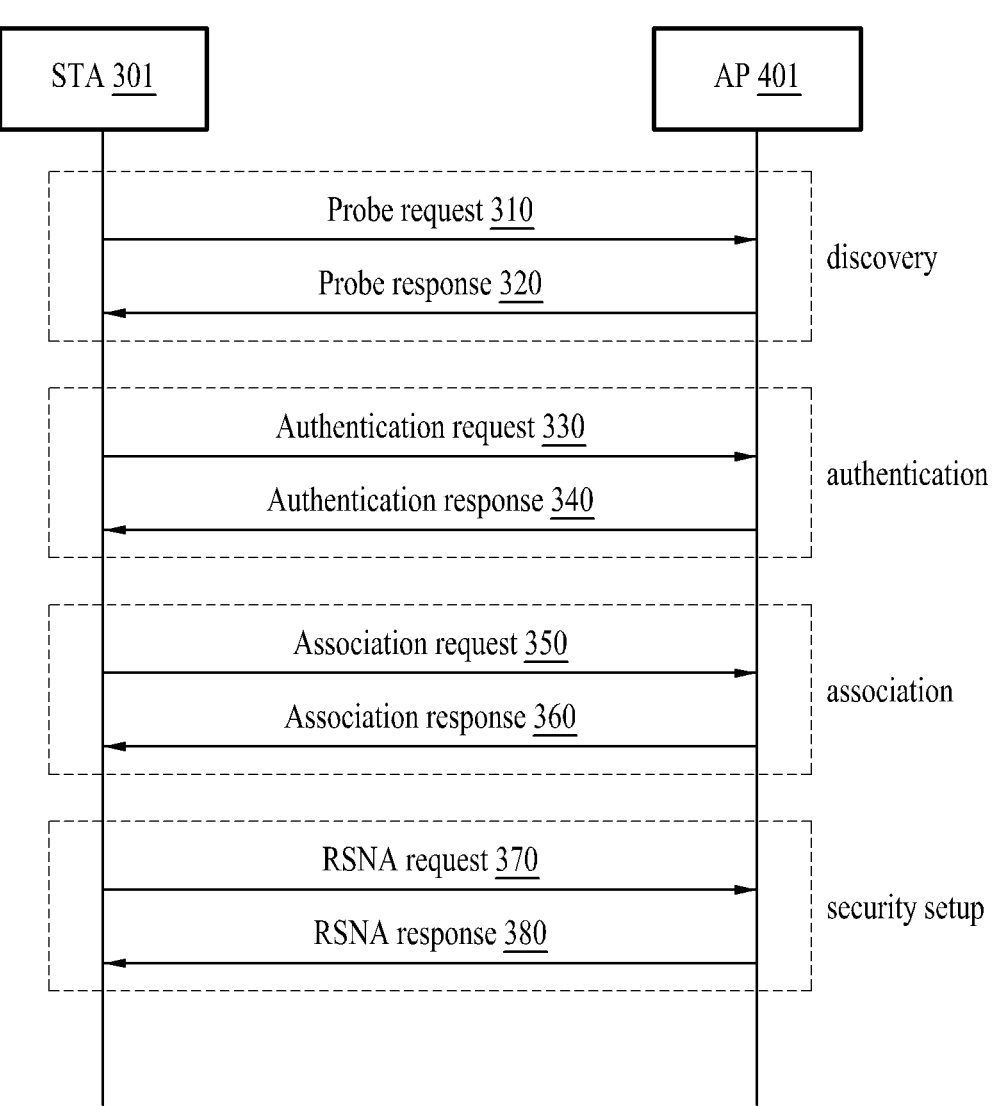
FIG. 3 is a diagram illustrating an example link setup operation according to an embodimentan embodiment of the present disclosure.

FIG. 3 is a diagram illustrating an example link setup operation according to an embodiment of the present disclosure.

Referring to FIG. 3, according to an embodiment, a link setup operation may be performed between devices (e.g., an STA 301 and an AP 401) to allow them to communicate. To set up a link, operations, such as network discovery, authentication, association establishment, and security setup, may be performed. Such a link setup operation may also be referred to as a session initiation operation or a session setup operation. The operations of the link setup operation, including discovery, authentication, association establishment, and security setup, may be collectively referred to as an association operation.

According to an embodiment, the network discovery may include operations 310 and 320. In operation 310, the STA 301 (e.g., the electronic device 1301, 1302, or 1304 of FIG. 13) may transmit a probe request frame to probe APs that are present and wait for a response to the probe request frame. The STA 301 may perform scanning for accessing a network and discover a network in which it is able to participate. The probe request frame may include information of the STA 301, for example, device name and/or address of the STA 301. The scanning in operation 310 may be active scanning. In operation 320, the AP 401 may transmit a probe response frame in response to the probe request frame to the STA 301 that has transmitted the probe request frame. The probe response frame may include information of the AP 401, for example, device name and/or network information of the AP 401. Although the network discovery is illustrated as being performed through the active scanning in FIG. 3, examples of which are not necessarily limited thereto, and in a case of passive scanning performed by the STA 301, such an operation of transmitting the probe request frame may be omitted. The STA 301 performing the passive scanning may receive a beacon frame transmitted from the AP 401 and perform the following subsequent operations.

According to an embodiment, after the STA 301 discovers the network, the authentication including operations 330 and 340 may be performed. In operation 330, the STA 301 may transmit an authentication request frame to the AP 401. In operation 340, the AP 401 may determine whether to authenticate the STA 301 based on information included in the authentication request frame. The AP 401 may provide the STA 301 with a result of the authentication through an authentication response frame. An authentication frame used for an authentication request/response may correspond to a management frame.

According to an embodiment, the authentication frame may include information about an authentication algorithm number, an authentication transaction sequence number, a status code, a challenge text, a robust security network (RSN), a finite cyclic group, and the like.

According to an embodiment, after the STA 301 is successfully authenticated, the association including operations 350 and 360 may be performed. In operation 350, the STA 301 may transmit an association request frame to the AP 401. In operation 360, the AP 401 may transmit an association response frame to the STA 301 in response to the association request frame.

According to an embodiment, the association request frame and/or the association response frame may include information regarding various capabilities. For example, the association request frame may include information regarding various capabilities that include, for example, information about a beacon listen interval, an SSID, a supported rate, a supported channel, an RSN, a mobility domain, a supported operating class, a traffic indication map (TIM) broadcast request, and/or an interworking service. For example, the association response frame may include information regarding various capabilities, such as, information about a status code, an association ID (AID), a supported rate, an enhanced distributed channel access (EDCA) parameter set, a received channel power indicator (RCPI), a received signal to noise indicator (RSNI), a mobility domain, a timeout interval (e.g., an association comeback time), an overlapping BSS scan parameter, a TIM broadcast response, and/or a quality of service (QoS) map.

According to an embodiment, after the STA 301 is successfully associated with the network, the security setup including operations 370 and 380 may be performed. The security setup may be performed through a robust security network association (RSNA) request/response. For example, the security setup may include a private key setup operation through four-way handshaking using an extensible authentication protocol over LAN (EAPOL) frame. The security setup may also be performed using another security scheme that is not defined in the IEEE 802.11 standards.

According to an embodiment, through the security setup, a security session may be set between the STA 301 and the AP 401, and the STA 301 and the AP 401 may thus perform secure data communication.

Figure 4:
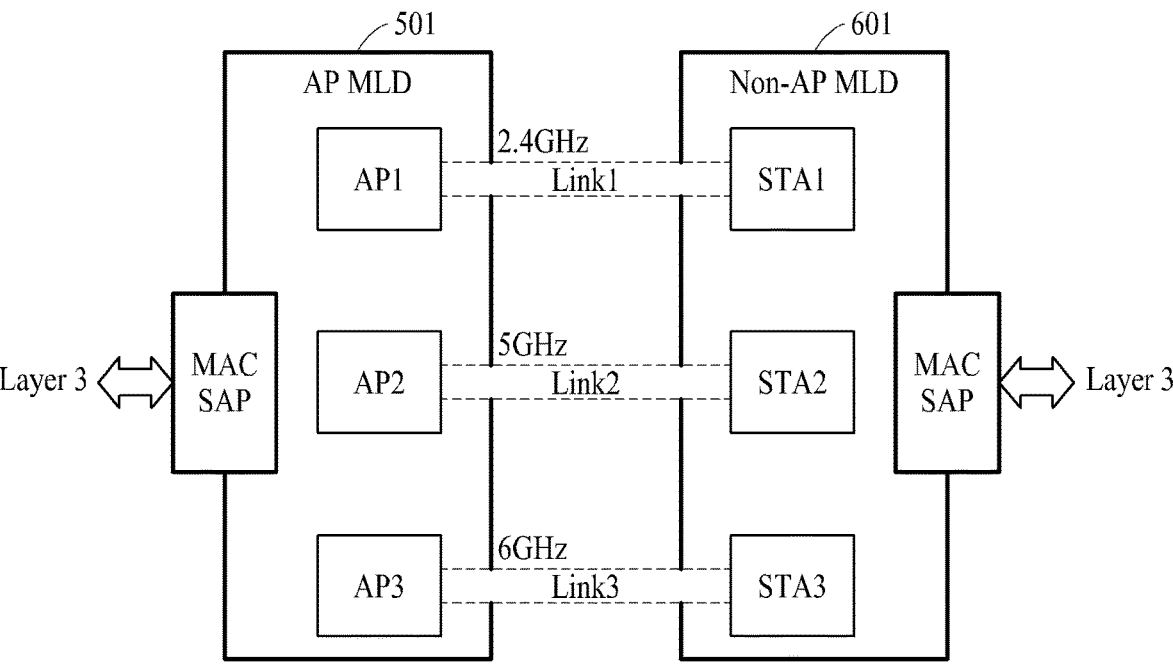
FIG. 4 is a diagram illustrating an example multi-link operation (MLO) according to an embodimentan embodiment of the present disclosure.

FIG. 4 is a diagram illustrating an example multi-link operation (MLO) according to an embodiment of the present disclosure.

Referring to FIG. 4, according to an embodiment, an AP multi-link device (MLD) (AP MLD) 501 (e.g., the AP 401 of FIG. 3) and a non-AP MLD 601 (e.g., the STA 301 of FIG. 3) may perform an MLO in which they communicate using a plurality of individual links (e.g., Link1, Link2, and Link3). The AP MLD 501 may be a device including one or more APs (e.g., AP1, AP2, and AP3). The AP MLD 501 may be a device connected to a logical link control (LLC) layer through one interface (e.g., a MAC service AP (SAP) (MAC SAP)). The APs (e.g., AP1, AP2, and AP3) included in the AP MLD 501 may share some functions in a MAC layer. The APs in the AP MLD 501 may operate in different links, for example, AP1 may operate through Link1, AP2 may operate through Link2, and AP3 may operate through Link3. A link described herein may be a channel or a band. The APs (e.g., AP1, AP2, and AP3) in the AP MLD 501 may each be responsible for a corresponding link and may perform an operation as an independent AP.

According to an embodiment, the non-AP MLD 601 may be a device including one or more non-APs (e.g., STA1, STA2, and STA3). The non-AP MLD 601 may be a device connected to the LLC layer through one interface (e.g., a MAC SAP). The non-APs (e.g., STA1, STA2, and STA3) included in the non-AP MLD 601 may share some functions in the MAC layer. The STAs in the non-AP MLD 601 may operate in different links, for example, STA1 may operate through Link1, STA2 may operate through Link2, and STA3 may operate through Link3. The STAs (e.g., STA1, STA2, and STA3) in the non-AP MLD 601 may each be responsible for a corresponding link and may perform an operation as an independent STA. A non-AP MLD described herein may also be referred to as a STA MLD.

According to an embodiment, in a case in which the AP MLD 501 includes a plurality of APs (e.g., AP1, AP2, and AP3), the APs (e.g., AP1, AP2, and AP3) may each form a separate link (e.g., Link1, Link2, and Link3) to perform frame transmission and reception using multiple links with respective STAs (e.g., STA1, STA2, and STA3) included in the non-AP MLD 601. For example, the links may operate in a 2.4 gigahertz (GHz) band, a 5 GHz band, and a 6 GHz band, respectively.

Figure 5:
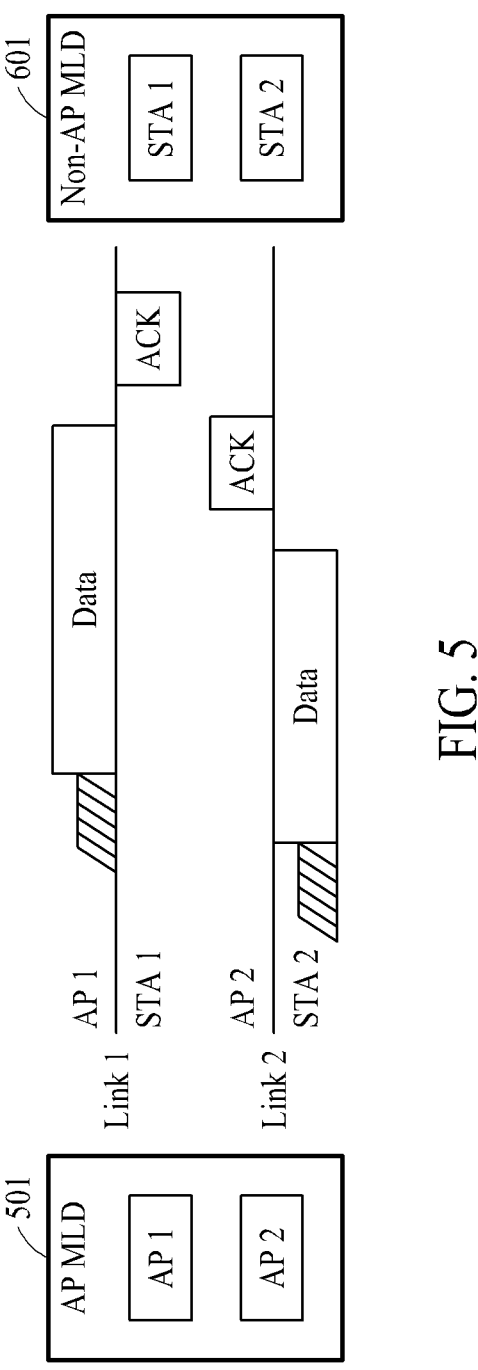
FIG. 5 is a diagram illustrating an example MLO according to an embodimentan embodiment of the present disclosure.

FIG. 5 is a diagram illustrating an example MLO according to an embodiment of the present disclosure.

Referring to FIG. 5, according to an embodiment, an MLD (e.g., the AP MLD 501 or the AP 401 of FIG. 3) and a non-AP MLD (e.g., the non-AP MLD 601 or the STA 301 of FIG. 3) may communicate with each other. The AP MLD 501 and/or the non-AP MLD 601 may perform uplink or downlink data transmission through an MLO. The AP MLD 501 may communicate with the non-AP MLD 601 through a plurality of links (e.g., Link1 and Link2). For example, STA1 of the non-AP MLD 601 may communicate with AP1 of the AP MLD 501 through Link1. STA1 of the non-AP MLD 601 may receive data from AP1 of the AP MLD 501 through Link1. Link 1 may be a downlink. STA2 of the non-AP MLD 601 may communicate with AP2 of the AP MLD 501 through Link2. STA2 of the non-AP MLD 601 may transmit data to AP2 of the AP MLD 501 through Link2. Link 2 may be an uplink.

According to an embodiment, a mapping between a traffic identifier (TID) and a link may be established. The TID may include information about traffic priority. A frame corresponding to a TID of a specific value may be exchanged only through a preset link. The mapping between a TID and a link may be set as a directional-based mapping. For example, Link1 may be set such that a frame corresponding to a first TID is transmitted from AP1 of the AP MLD 501 to STA1 of the non-AP MLD 601. For example, Link2 may be set such that a frame corresponding to a second TID is transmitted from STA2 of the non-AP MLD 601 to AP2 of the AP MLD 501. In a case that there is no mapping set between a TID and a link, all TIDs may be exchanged on any one link.

Figure 6:
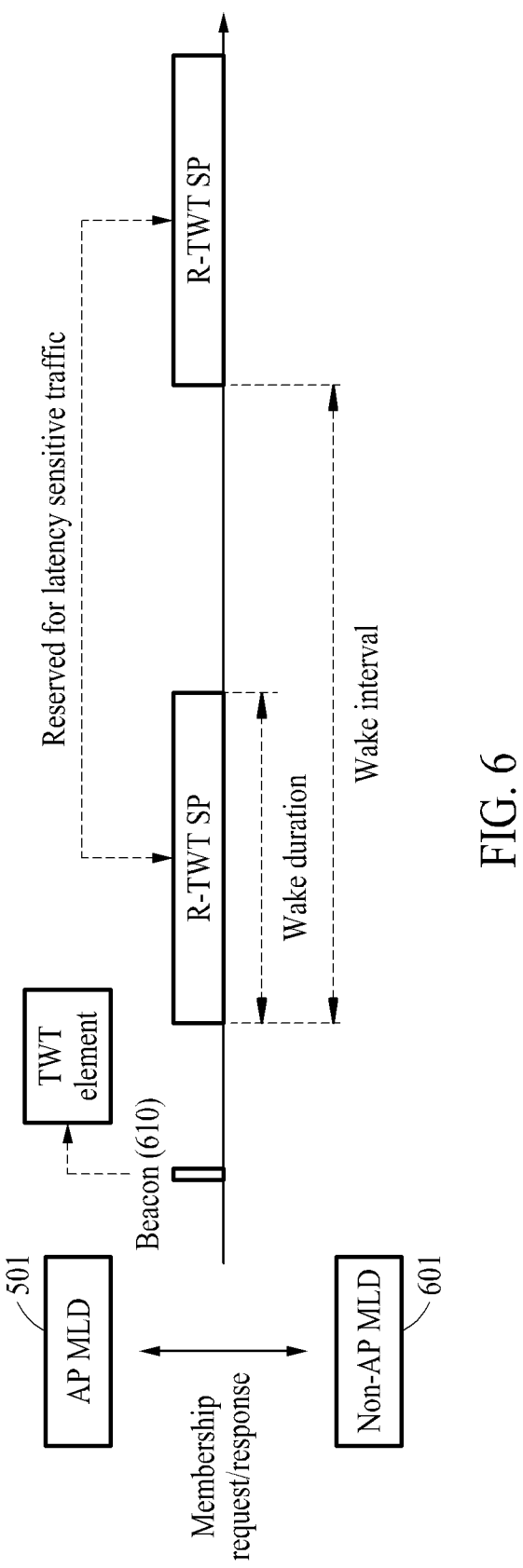
FIG. 6 is a diagram illustrating a restricted target wake time (R-TWT) protocol according to an embodimentan embodiment of the present disclosure.

FIG. 6 is a diagram illustrating a restricted target wake time (R-TWT) protocol according to an embodiment of the present disclosure.

According to an embodiment, in a wireless communication system (e.g., the WLAN system 10 of FIG. 1 and the WLAN system 20 of FIG. 2), the non-AP MLD 601 (e.g., the STA 301 of FIG. 3) and/or the AP MLD 501 (e.g., the AP 401 of FIG. 3) may perform wireless communication according to an R-TWT protocol. The R-TWT protocol may be a protocol for supporting a latency demanding service for transmitting and receiving latency-sensitive traffic. The R-TWT protocol may refer to a technology for preferentially securing transmission/reception time for the latency-sensitive traffic using a broadcast target wake time (TWT). The latency-sensitive traffic may be traffic included in a predefined access category (AC). The latency-sensitive traffic may be traffic to which a predefined TID is assigned. Latency may be defined in the IEEE 802.11ax standards. Latency may refer to an interval between a point in time at which a packet is transmitted from a source and a point in time at which the packet arrives at a destination.

According to an embodiment, the AP MLD 501 (e.g., the AP 401 of FIG. 3) and/or the non-AP MLD 601 (e.g., the STA 301 of FIG. 3) may perform wireless communication based on TWT settings (e.g., TWT parameters). The TWT parameters may be operating parameters (e.g., periodic parameters and/or aperiodic parameters) for communication between the AP MLD 501 and the non-AP MLD 601 based on the TWT protocol. The TWT parameters may include information about an R-TWT service period (SP). For example, the TWT parameters may include start time information of an R-TWT SP, duration information of the R-TWT SP, and/or R-TWT interval information of the R-TWT SP.

According to an embodiment, the AP MLD 501 (e.g., the AP 401 of FIG. 3) may implement the R-TWT protocol through a broadcast TWT. In the broadcast TWT, an AP (e.g., the AP 401 of FIG. 3 or the AP MLD 501) may perform scheduling in advance on an R-TWT SP, and a STA (e.g., the STA 301 of FIG. 3 or the non-AP MLD 601) may request membership for the scheduled R-TWT SP. The broadcast TWT may include an operation in which the AP (e.g., the AP 401 of FIG. 3 or the AP MLD 501) advertises a beacon signal (e.g., a beacon signal 610) including a TWT element. The beacon signal 610 may include the TWT element (e.g., a TWT element of FIG. 7). The TWT element may include the TWT parameters. The TWT parameters may include information about the R-TWT SP.

According to an embodiment, the AP MLD 501 (e.g., the AP 401 of FIG. 3) may advertise the beacon signal 610 including information about an R-TWT SP of a link, information about a TID mapped to the link, and information about a direction (e.g., uplink or downlink) of the link. The non-AP MLD 601 (e.g., the STA 301 of FIG. 3) that desires to transmit (or receive) traffic mapped to the link during the R-TWT SP of the link may transmit a membership request frame to the AP MLD 501. When the AP MLD 501 accepts such a membership request from the non-AP MLD 601, the non-AP MLD 601 may transmit (or receive) the traffic mapped to the link during the R-TWTSP.

According to an embodiment, a beacon signal (e.g., the beacon signal 610) may be advertised for each link included in multiple links of the AP MLD 501. That is, the beacon signal may include information about a corresponding link, for example, information about an R-TWT SP of the link, information about a TID mapped to the link, and information about a direction of the link. The beacon signal may also include information about another link different from the corresponding link, in addition to the information about the link. The non-AP MLD 601 may request membership from the AP MLD 501 for the link corresponding to the beacon signal. The non-AP MLD 601 may request membership from the AP MLD 501 for the other link based on the information about the other link included in the beacon signal, for example, information about a link different from the link corresponding to the beacon signal.

Figure 7:
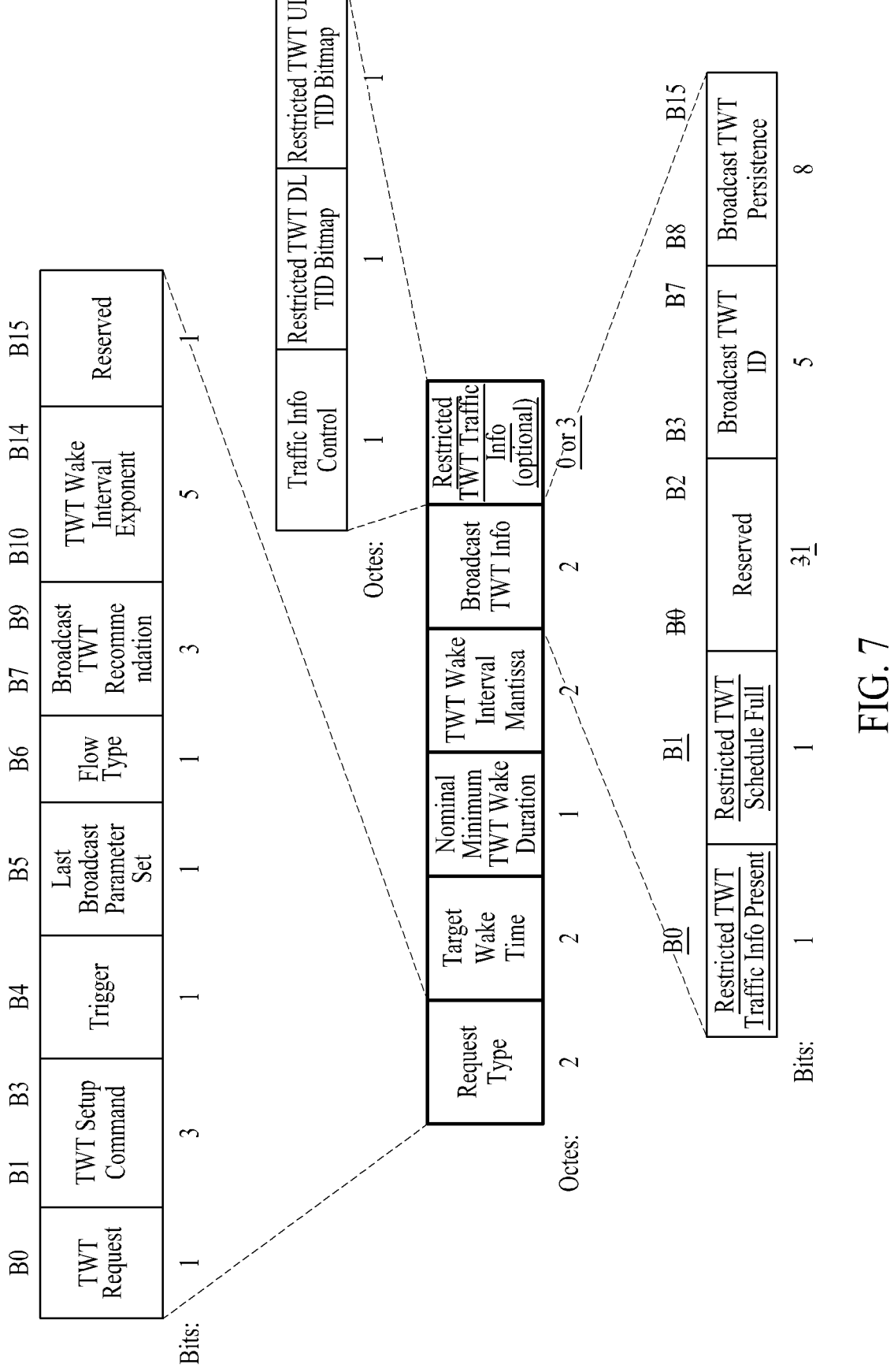
FIG. 7 is a diagram illustrating an example target wake time (TWT) element used for an R-TWT protocol according to an embodimentan embodiment of the present disclosure.

FIG. 7 is a diagram illustrating an example TWT element used for an R-TWT protocol according to an embodiment of the present disclosure.

Referring to FIG. 7, according to an embodiment, a TWT element may be of a broadcast TWT parameter set field format according to IEEE 802.11 (e.g., IEEE 802.11ax). The TWT element may include a request type field, a TWT field, a nominal minimum TWT wake duration field, a TWT wake interval mantissa field, a broadcast TWT information field, and an R-TWT TID information field. In this case, the request type field may include a plurality of sub-fields, for example, a TWT request field, a TWT setup command field, a trigger field, a last broadcast parameter set field, a flow type field, a broadcast TWT recommendation field, a TWT wake interval exponent field, and a reserved field.

According to an embodiment, the TWT element may include TWT parameters. The TWT parameters may include information about an R-TWT SP. The information about an R-TWT SP may include start time information of the R-TWT SP, duration information of the R-TWT SP, and/or interval information of the R-TWT SP. The TWT parameters may be determined by setting values of one or more fields among a plurality of fields included in the TWT element. A point in time at which a TWT SP starts may be set in the TWT field of the TWT element, and a TWT duration during which the TWT SP lasts (or is maintained) may be set in the nominal minimum TWT wake duration field of the TWT element. A TWT interval (e.g., an interval value) of the TWT SP may be determined by values set in the TWT wake interval mantissa field and the TWT wake interval exponent field of the TWT element. In addition, information about a mantissa for determining the TWT interval may be set in the TWT wake interval mantissa field, and information about an exponent value for determining the TWT interval having a base of 2 may be set in the TWT wake interval exponent field. The size of the TWT interval may be determined based on a value of the TWT wake interval mantissa×2 (the TWT wake interval exponent).

According to an embodiment, the broadcast TWT information field may include a plurality of sub-fields, for example, a present R-TWT traffic information field, an R-TWT full schedule field, a reserved field, a broadcast TWT ID field, and a broadcast TWT persistence field. The present R-TWT traffic information field may be set to 1 in the presence of an R-TWT parameter set, indicating the presence of the R-TWT traffic information field. In a case in which there is no probability that an AP performing R-TWT scheduling accepts new membership in a corresponding schedule, the R-TWT schedule full field may be set to 1 and may then be indicated as such. The broadcast TWT ID field may include information about a broadcast TWT ID. The broadcast TWT ID field may be used to determine a mapping between a TWT ID and a TWT SP. The broadcast TWT persistence field may include information about a period for which the broadcast TWT information lasts (or is maintained). The broadcast TWT persistence field may include information about a beacon period.

According to an embodiment, the R-TWT traffic information field may include a plurality of sub-fields, for example, a traffic information control field, an R-TWT downlink TID bitmap field, and an R-TWT uplink TID bitmap field. The R-TWT traffic information field may be present when a value of the present R-TWT traffic information field is 1. The traffic information control field may include a downlink TID bitmap valid field, an uplink TID bitmap valid field, and a reserved field. The downlink TID bitmap valid field may indicate whether there is valid information in the R-TWT downlink TID bitmap field. When a value of the downlink TID bitmap valid field is zero (0), downlink traffic of all TIDs may be identified as latency-sensitive traffic, and the R-TWT downlink TID bitmap field may be reserved. The uplink TID bitmap valid field may indicate whether there is valid information in the R-TWT uplink TID bitmap field. When a value of the uplink TID bitmap valid field is 0, uplink traffic of all TIDs may be identified as latency-sensitive traffic, and the R-TWT uplink TID bitmap field may be reserved. The R-TWT downlink TID bitmap field and the R-TWT uplink TID bitmap field may specify which TID is identified as a downlink direction and an uplink direction in a latency-sensitive traffic stream by a TWT scheduling AP or a TWT scheduled STA, respectively. When a bit position k value of a bitmap is 1, TID k may be classified as the latency-sensitive traffic stream. When the bit position k value of the bitmap is 0, the TID k may not be classified as the latency-sensitive traffic stream.

Figure 8:
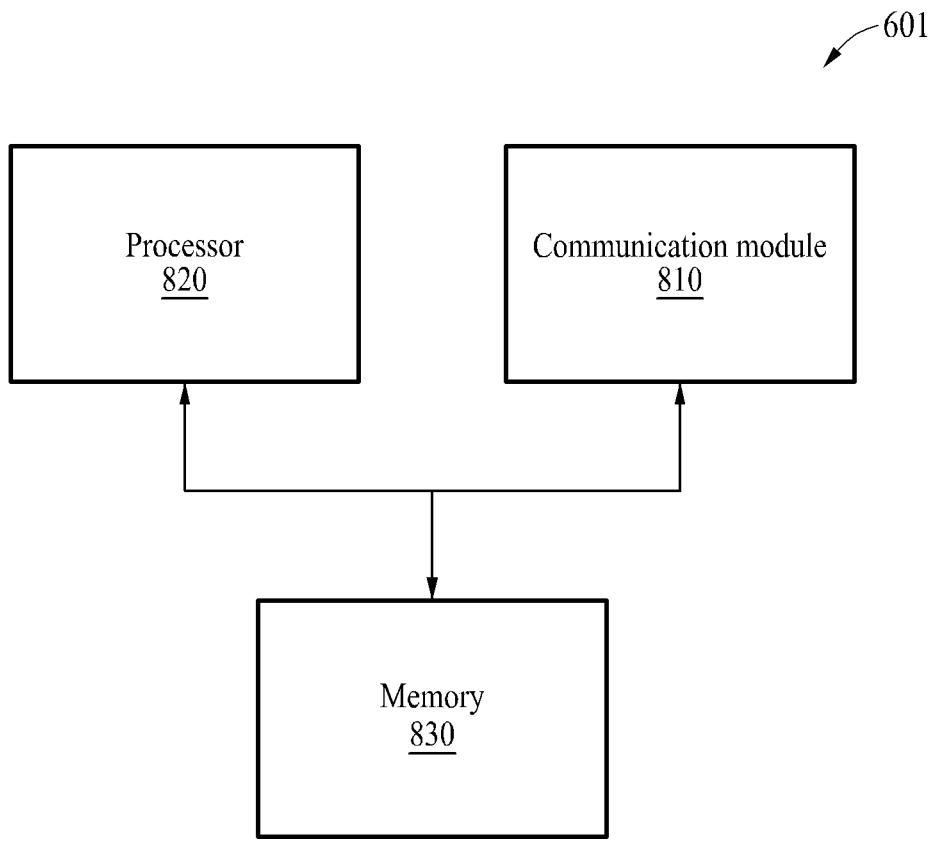
FIG. 8 is a schematic block diagram illustrating an example non-access point (non-AP) multi-link device (MLD) according to an embodimentan embodiment of the present disclosure.

FIG. 8 is a schematic block diagram illustrating an example non-AP MLD according to an embodiment of the present disclosure.

According to an embodiment, the non-AP MLD 601 (e.g., the STA 301 of FIG. 3) may simultaneously perform an MLO and an R-TWT operation. In a Wi-Fi 7 network supporting the MLO and the R-TWT, an AP MLD (e.g. the AP MLD 501 of FIG. 4) may dynamically set (e.g., perform R-TWT scheduling) a TWT SP of a link, based on a QoS requirement different for each type of service that is available to be executed in a peripheral device (e.g., the STA 301 of FIG. 3, the non-AP MLD 601 of FIG. 4, or the electronic device 1301, the electronic device 1302, or the electronic device 1304 of FIG. 13). In the Wi-Fi 7 network supporting the MLO and the R-TWT, the non-AP MLD 601 may determine at least one link according to a type of a service to be executed and request membership from the AP MLD

501 for the determined link. The non-AP MLD 601 may use a link that satisfies a latency requirement and a throughput requirement that are different according to each type of service to be executed, while not compromising the usability of other devices within a network.

Figure 13:
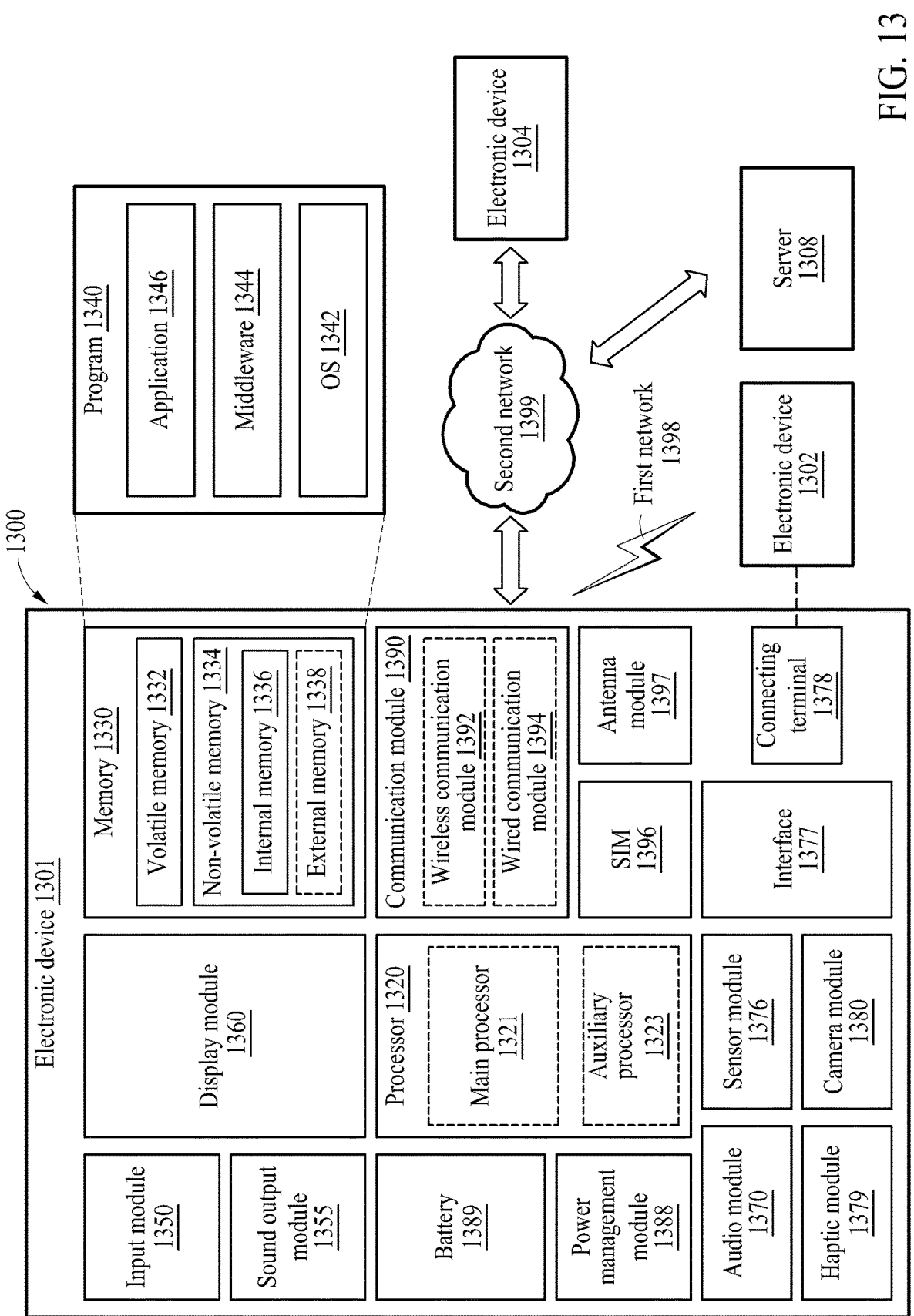
FIG. 13 is a block diagram illustrating an example electronic device in a network environment according to an embodimentan embodiment of the present disclosure.

Referring to FIG. 8, according to an embodiment, the non-AP MLD 601 may include a wireless communication module 810 (e.g., a wireless communication module 1392 of FIG. 13), a processor 820 (e.g., a processor 1320 of FIG. 13), and a memory 830 (e.g., a memory 1330 of FIG. 13). The wireless communication module 810 may be configured to transmit and receive wireless signals. The wireless communication module 810 may be a Wi-Fi chipset. The processor 820 may be operatively connected to the wireless communication module 810. The memory 830 may be electrically connected to the processor 820 and may store instructions executable by the processor 820. The non-AP MLD 601 may correspond to an electronic device to be described below with reference to FIG. 13 (e.g., the electronic device 1301 of FIG. 13), and thus a redundant description related thereto will be omitted here.

According to an embodiment, the processor 820 may receive at least one beacon signal (e.g., the beacon signal 610 of FIG. 6) including information about the R-TWT SP of each link included in multiple links. The R-TWT SP may be dynamically configured based on a QoS requirement different for each type of service to be executed in a peripheral device (e.g., the STA 301 of FIG. 3, the non-AP MLD 601 of FIG. 4, or the electronic device 1301, the electronic device 1302, or the electronic device 1304 of FIG. 13). Links (e.g., Link1, Link2, and Link3 of FIG. 9) included in the multiple links may have different R-TWT SPs, respectively, such that they satisfy different QoS requirements for each type of service to be executed in a device. At least one beacon signal (e.g., the beacon signal 610) including R-TWT scheduling information for each link may be transmitted from the AP MLD 501. R-TWT scheduling may be performed by the AP MLD 501. The R-TWT scheduling operation of the AP MLD 501 will be described in detail below with reference to FIG. 9.

According to an embodiment, a beacon signal (e.g., the beacon signal 610 of FIG. 6) may be advertised for each link included in the multiple links of the AP MLD 501. That is, the beacon signal may include information about a corresponding link, for example, information about an R-TWT SP of the link, information about a TID mapped to the link, and information about a direction of the link). The beacon signal may also include information about another link in addition to the information about the corresponding link.

According to an embodiment, the processor 820 may determine at least one link from among the multiple links based on at least one beacon signal. The processor 820 may determine the at least one link from among the multiple links by comparing the information about the R-TWT SP different for each link (e.g., R-TWT SP start time information, R-TWT SP duration information, and/or R-TWT SP interval information) and a QoS requirement of a service to be executed in the non-AP MLD 601 (e.g., a latency requirement and/or a throughput requirement of the service). For example, the processor 820 may determine, from among the multiple links, at least one link having an R-TWT interval that is less than the latency requirement of the service (e.g., the service to be executed in the non-AP MLD 601). For example, the processor 820 may determine, from among the multiple links, at least one link having an R-TWT duration that is sufficiently great to exchange data to be generated in response to the throughput requirement of the service. This operation of determining a link of the non-AP MLD 601 will be described in detail below with reference to FIGS. 10 and 11.

According to an embodiment, at least one beacon signal (e.g., the beacon signal 610 of FIG. 6) including R-TWT scheduling information for each link may further include TID information mapped to a link and direction information of the link. The processor 820 may compare information about the R-TWT SP and a QoS requirement of a service to be executed in the non-AP MLD 601, for each link. The processor 820 may compare the TID information and TID information of traffic to be generated in the service, for each link. The processor 820 may compare the direction information of the link and direction information of the traffic to be generated in the service, for each link. The processor 820 may determine at least one link from among the multiple links by comparing information about a link and information associated with a service. According to an embodiment, the processor 820 may transmit and receive data via the communication module 810 based on the at least one link. The processor 820 may request membership from the AP MLD 501 for at least one link. The processor 820 may transmit and receive data through at least one link based on a result of requesting the membership.

According to an embodiment, the non-AP MLD 601 may simultaneously transmit data through a plurality of links by performing the MLO. The non-AP MLD 601 may increase a transmission rate in proportion to the number of links. The non-AP MLD 601 may predict a transmission delay time and reduce the transmission delay time. Due to the nature of Wi-Fi networks using unlicensed bands, there may be a great change in the transmission delay time of the non-AP MLD 601 depending on traffic usage of a peripheral device (e.g., other devices different from the non-AP MLD 601). A certain delay time may be required for a communication service of good quality, and the non-AP MLD 601 may maintain a constant transmission delay time by using a plurality of links simultaneously. For example, even if the transmission delay time increases at a preset point in time on a specified link, the constant transmission delay time of the non-AP MLD 601 may be maintained in total as long as smooth transmission is performed on other links different from the specified link. As the constant transmission delay time is maintained through the MLO, the non-AP MLD 601 may also maintain a constant quality of communication service.

According to an embodiment, the non-AP MLD 601 may provide a communication service of good quality, using the R-TWT protocol. The R-TWT protocol may be a protocol that allows, as members of an R-TWT SP, only devices that transmit and receive traffic (e.g., traffic mapped to a specified TID) corresponding to a specified priority. The R-TWT protocol may be a protocol that allows devices that are not members of the R-TWT SP to complete all transmissions before the R-TWT SP starts. The membership of the R-TWT protocol may be allowed only to devices that desire to transmit and receive latency-sensitive traffic. Even when a plurality of devices operates in connection with the non-AP MLD 601, the latency-sensitive traffic may be transmitted and received in the R-TWT SP without interference from other devices (e.g., devices without the membership). Through the R-TWT protocol, the non-AP MLD 601 may provide a constant communication quality without being affected by a traffic usage status of other devices.

Figure 9:
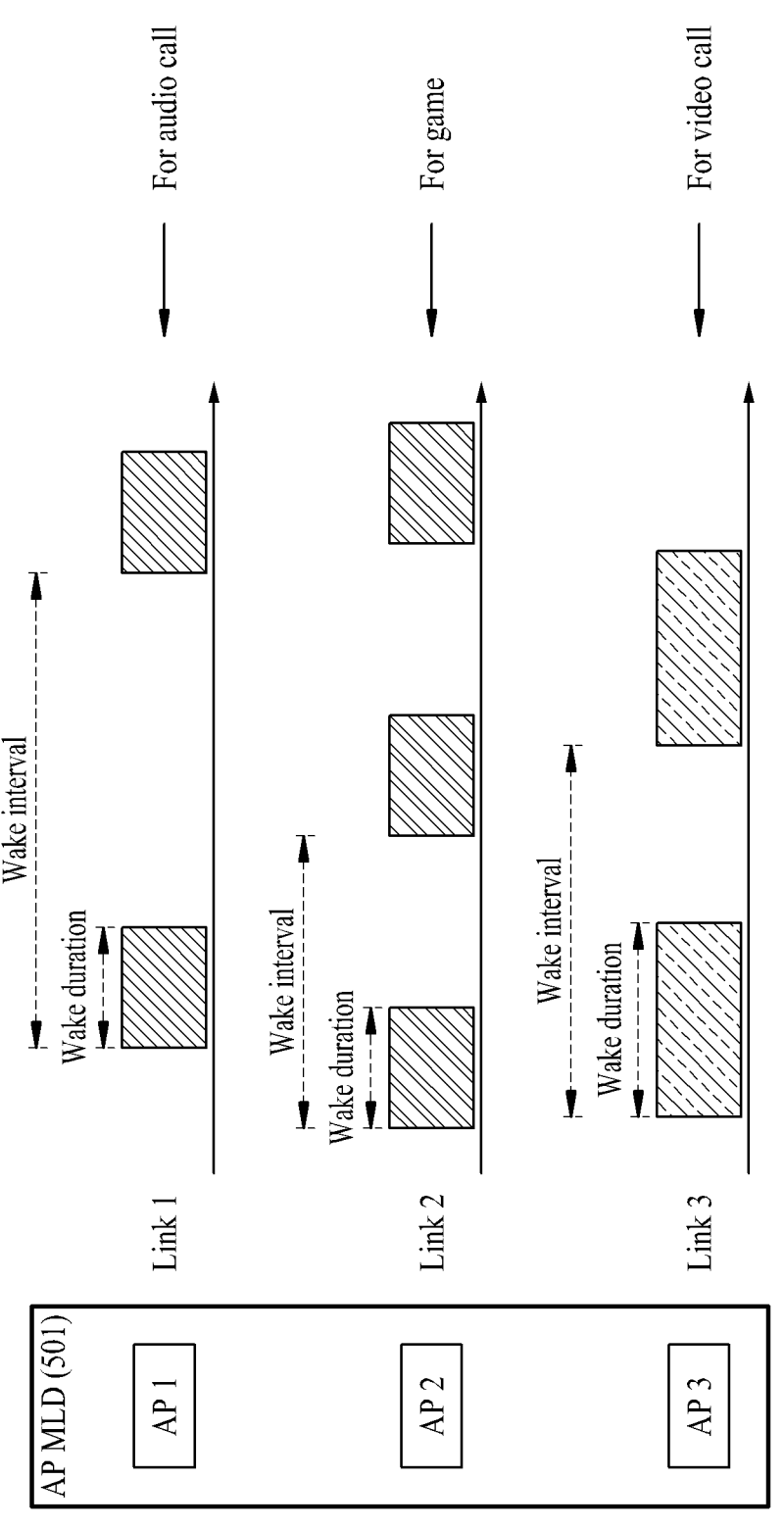
FIG. 9 is a diagram illustrating an example operation in which an AP MLD sets an R-TWT service period (SP) different for each link included in multiple links according to an embodimentan embodiment of the present disclosure.

FIG. 9 is a diagram illustrating an example operation in which an AP MLD sets an R-TWT SP different for each link included in multiple links according to an embodiment of the present disclosure.

According to an embodiment, referring to FIG. 9, the AL MLD 501 (e.g., the AP 401 of FIG. 3) may perform R-TWT scheduling for each link. The AP MLD 501 may set a different R-TWT SP for each link. The AP MLD 501 may be dynamically configured based on a QoS requirement (e.g., a latency requirement and/or a throughput requirement) that is different for each type of service (e.g., audio call, game, or video call) to be executed in a peripheral device (e.g., the STA 301 of FIG. 3, the non-AP MLD 601 of FIG. 4, or the electronic device 1301, the electronic device 1302, or the electronic device 1304 of FIG. 13). That is, the latency requirement and the throughput requirement may be different according to a type of service.

According to an embodiment, an R-TWT SP of Link1 may be set based on a QoS requirement (e.g., a latency requirement and/or a throughput requirement) for an audio call. To Link1, a TID corresponding to the audio call may be mapped. An R-TWT SP of Link2 may be set based on a QoS requirement for a game. To Link2, a TID corresponding to the game may be mapped. An R-TWT SP of Link3 may be set based on a QoS requirement for a video call. To Link3, a TID corresponding to the video call may be mapped. The AP MLD 501 may set a different R-TWT SP for each link so as not to degrade the usability of devices that do not use an R-TWT service. The AP MLD 501 may secure a sufficient period that does not correspond to the R-TWT SP for each link so as not to degrade the usability of devices that do not use the R-TWT service.

Figure 10:
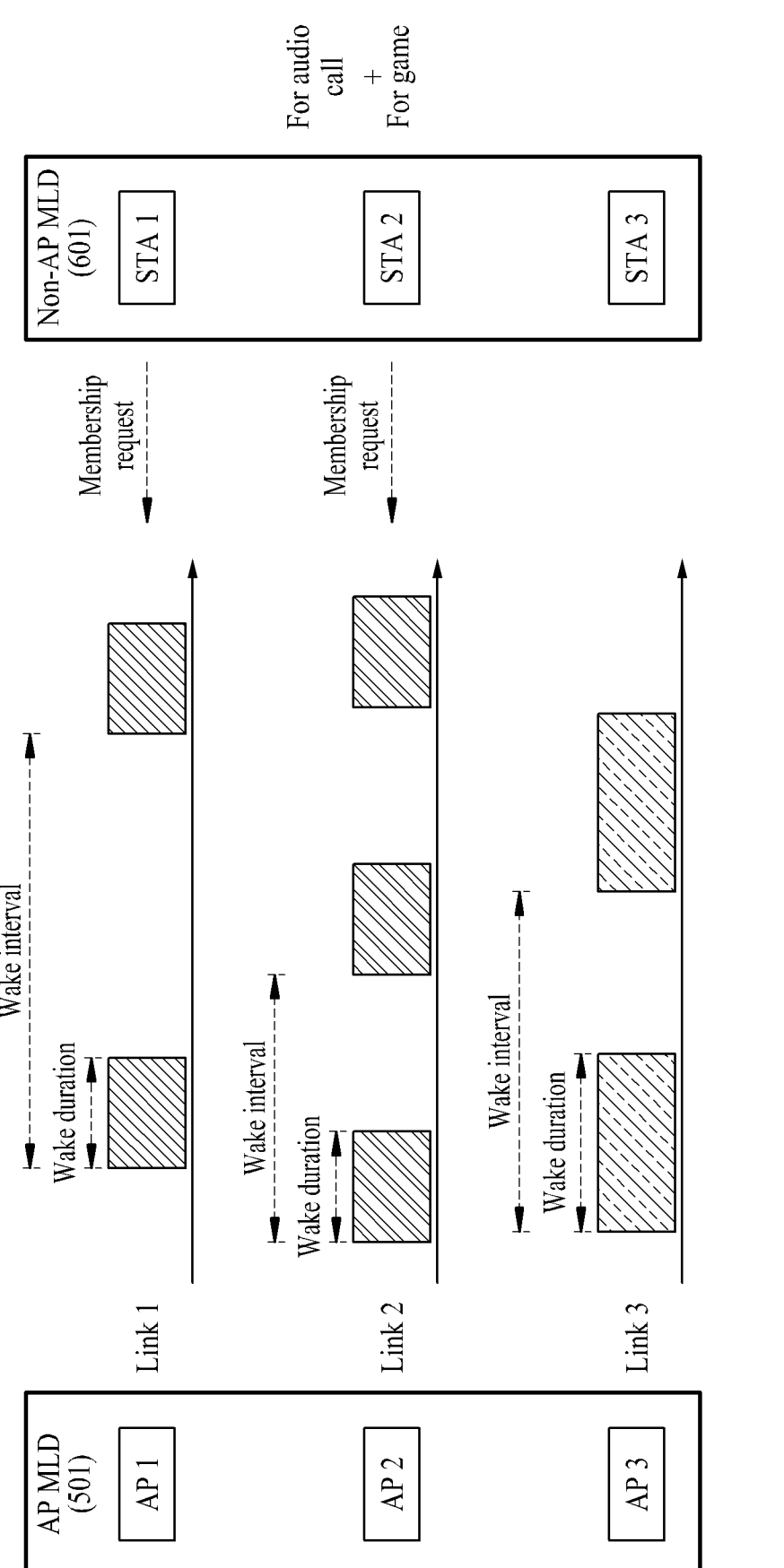
FIGS. 10 and 11 are diagrams illustrating example operations in which a non-AP MLD determines a link based on a quality of service (QoS) according to an embodimentan embodiment of the present disclosure.
Figure 11:
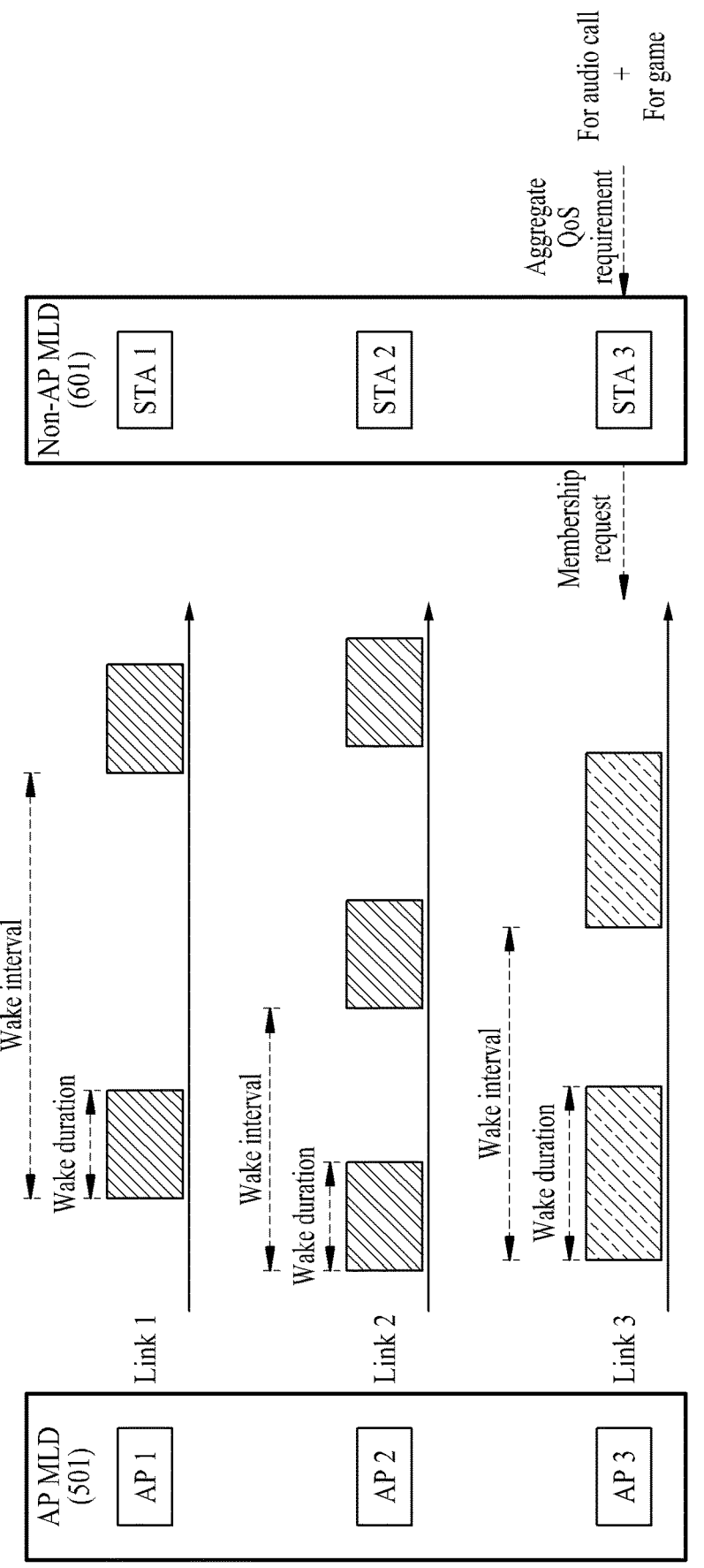

FIGS. 10 and 11 are diagrams illustrating example operations in which a non-AP MLD determines a link based on a QoS according to an embodiment of the present disclosure.

According to an embodiment, the non-AP MLD 601 (e.g., the STA 301 of FIG. 3) may determine at least one link from among multiple links based on a QoS requirement for each type of service to be executed. The non-AP MLD 601 may detect a latency-demanding service that transmits and receives latency-sensitive traffic. The non-AP MLD 601 may obtain a QoS requirement (e.g., a latency requirement and/or a throughput requirements) for the latency-demanding service to be executed. The non-AP MLD 601 may compare the QoS requirement of the service to be executed and information about R-TWT SP different for each link. The non-AP MLD 601 may determine, from among the multiple links, a link that satisfies the latency requirement and the throughput requirement for the service to be executed. The non-AP MLD 601 may determine, from among the multiple links, a link having an R-TWT interval that is less than the latency requirement of the service. The non-AP MLD 601 may determine, from among the multiple links, a link having an R-TWT duration that is sufficiently great to exchange data to be generated in response to the throughput requirement of the service. The non-AP MLD 601 may request membership from the AP MLD 501 for the determined link.

According to an embodiment, referring to FIG. 9, the non-AP MLD 601 may request R-TWT membership for Link1 that satisfies a QoS requirement for an audio call to be executed. The non-AP MLD 601 may request R-TWT membership for Link2 that satisfies a QoS requirement for a game to be executed. The non-AP MLD 601 may request R-TWT membership for Link3 that satisfies a QoS requirement for a video call to be executed. The non-AP MLD 601 may use a plurality of services simultaneously.

Referring to FIG. 10, according to an embodiment, the non-AP MLD 601 may determine a plurality of links respectively corresponding to a plurality of services from among multiple links. The plurality of links may satisfy QoS requirements of the plurality of services. For example, to simultaneously execute an audio call and a game, the non-AP MLD 601 may determine Link1 that satisfies a QoS requirement of the audio call and Link2 that satisfies a QoS requirement of the game. The non-AP MLD 601 may request R-TWT membership for Link1 and Link2.

Referring to FIG. 11, according to an embodiment, the non-AP MLD 601 may determine a link based on an aggregate QoS requirement in which the QoS requirements of the plurality of services are integrated. For example, to simultaneously execute an audio call and a game, the non-AP MLD 601 may determine Link3 that simultaneously satisfies the QoS requirements of the audio call and the game. The non-AP MLD 601 may request R-TWT membership for Link3.

Figure 12:
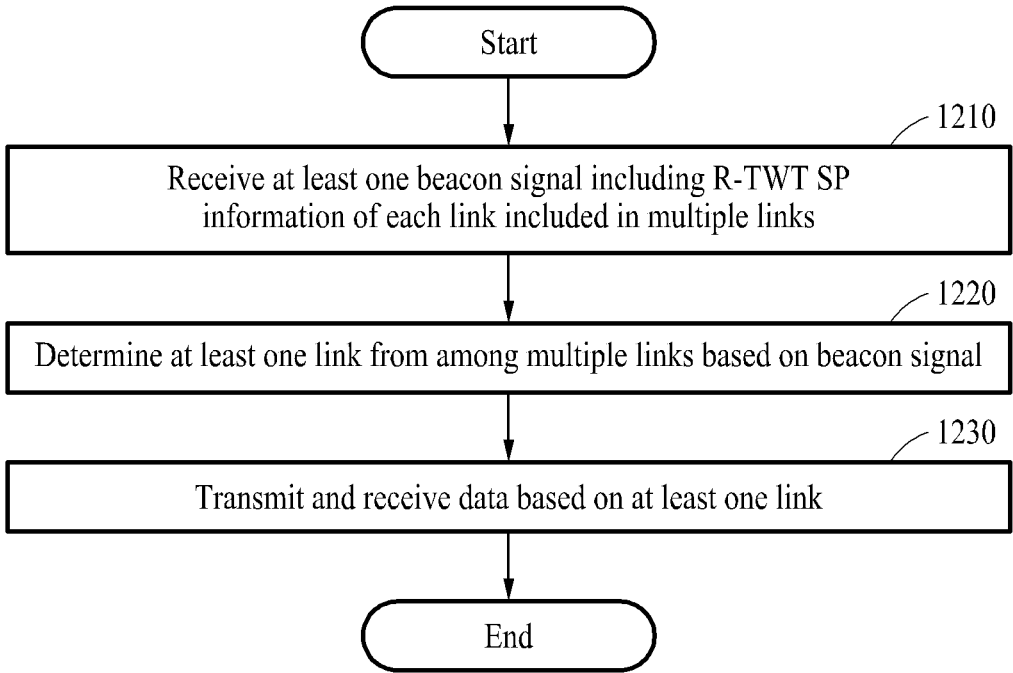
FIG. 12 is a flowchart illustrating an example method of operating a non-AP MLD according to an embodimentan embodiment of the present disclosure.

FIG. 12 is a flowchart illustrating an example method of operating a non-AP MLD according to an embodiment of the present disclosure.

Operations 1210 through 1230 may be performed in sequential order but are not required to be performed in sequential order. For example, operations 1210 through 1230 may be performed in different orders, and at least two of operations 1210 through 1230 may be performed in parallel.

In operation 1210, the non-AP MLD 601 (e.g., the STA 301 of FIG. 3) may receive at least one beacon signal including information about the R-TWT SP of each of links included in multiple links. An R-TWT SP may be dynamically configured based on a QoS requirement that is different for each type of service to be executed in a peripheral device (e.g., the STA 301 of FIG. 3, the non-AP MLD 601, or the electronic device 1301, 1302, or 1304 of FIG. 13). Each of the links included in the multiple links may have a different R-TWT SP to satisfy the different QoS requirement for each type of service to be executed in a peripheral device (e.g., the STA 301 of FIG. 3, the non-AP MLD 601, or the electronic device 1301, 1302, or 1304 of FIG. 13).

In operation 1220, the non-AP MLD 601 may determine at least one link from among the multiple links based on the beacon signal (e.g., a beacon signal including information about the R-TWT SP). The non-AP MLD 601 may determine at least one link from among the multiple links by comparing different information about the R-TWT SP for each link (e.g., R-TWT SP start time information, R-TWT SP duration information, or R-TWT SP interval information) and a QoS requirement (e.g., a latency requirement and/or a throughput requirement) of a service to be executed in the non-AP MLD 601.

In operation 1230, the non-AP MLD 601 may transmit and receive data based on at least one link. The non-AP MLD 601 may request membership for at least one link. The non-AP MLD 601 may transmit and receive data through at least one link based on a result of requesting the membership.

FIG. 13 is a block diagram illustrating an example electronic device in a network environment according to an embodiment of the present disclosure.

Referring to FIG. 13, an electronic device 1301 in a network environment 1300 may communicate with an electronic device 1302 via a first network 1398 (e.g., a short-range wireless communication network), or communicate with at least one of an electronic device 1304 and a server 1308 via a second network 1399 (e.g., a long-range wireless communication network). According to an embodiment, the electronic device 1301 may communicate with the electronic device 1304 via the server 1308. According to an embodiment, the electronic device 1301 may include a processor 1320, a memory 1330, an input module 1350, a sound output module 1355, a display module 1360, an audio module 1370, a sensor module 1376, an interface 1377, a connecting terminal 1378, a haptic module 1379, a camera module 1380, a power management module 1388, a battery 1389, a communication module 1390, a subscriber identification module (SIM) 1396, or an antenna module 1397. In an embodiment, at least one (e.g., the connecting terminal 1378) of the above components may be omitted from the electronic device 1301, or one or more other components may be added to the electronic device 1301. In an embodiment, some (e.g., the sensor module 1376, the camera module 1380, or the antenna module 1397) of the components may be integrated as a single component (e.g., the display module 1360).

The processor 1320 may execute, for example, software (e.g., a program 1340) to control at least one other component (e.g., a hardware or software component) of the electronic device 1301 connected to the processor 1320 and may perform various data processing or computations. According to an embodiment, as at least a part of data processing or computations, the processor 1320 may store a command or data received from another component (e.g., the sensor module 1376 or the communication module 1390) in a volatile memory 1332, process the command or data stored in the volatile memory 1332, and store resulting data in a non-volatile memory 1334. According to an embodiment, the processor 1320 may include a main processor 1321 (e.g., a central processing unit (CPU) or an application processor (AP)) or an auxiliary processor 1323 (e.g., a graphics processing unit (GPU), a neural processing unit (NPU), an image signal processor (ISP), a sensor hub processor, or a communication processor (CP)) that is operable independently from or in conjunction with, the main processor 1321. For example, when the electronic device 1301 includes the main processor 1321 and the auxiliary processor 1323, the auxiliary processor 1323 may be adapted to consume less power than the main processor 1321 or to be specific to a specified function. The auxiliary processor 1323 may be implemented separately from the main processor 1321 or as a part of the main processor 1321.

The auxiliary processor 1323 may control at least some of functions or states related to at least one (e.g., the display device 1360, the sensor module 1376, or the communication module 1390) of the components of the electronic device 1301, instead of the main processor 1321 while the main processor 1321 is in an inactive (e.g., sleep) state or along with the main processor 1321 while the main processor 1321 is an active state (e.g., executing an application). According to an embodiment, the auxiliary processor 1323 (e.g., an ISP or a CP) may be implemented as a portion of another component (e.g., the camera module 1380 or the communication module 1390) that is functionally related to the auxiliary processor 1323. According to an embodiment, the auxiliary processor 1323 (e.g., an NPU) may include a hardware structure specifically for artificial intelligence (AI) model processing. An AI model may be generated by machine learning. The machine learning may be performed by, for example, the electronic device 1301, in which the AI model is performed, or performed via a separate server (e.g., the server 1308). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 1330 may store various pieces of data used by at least one component (e.g., the processor 1320 or the sensor module 1376) of the electronic device 1301. The various pieces of data may include, for example, software (e.g., the program 1340) and input data or output data for a command related thereto. The memory 1330 may include the volatile memory 1332 or the non-volatile memory 1334. The non-volatile memory 1334 may include an internal memory 1336 and an external memory 1338.

The program 1340 may be stored as software in the memory 1330 and may include, for example, an operating system (OS) 1342, middleware 1344, or an application 1346.

The input module 1350 may receive from outside (e.g., a user) the electronic device 1301, a command or data to be used by another component (e.g., the processor 1320) of the electronic device 1301. The input module 1350 may include, for example, a microphone, a mouse, a keyboard, a key (e.g., a button), or a digital pen (e.g., a stylus pen).

The sound output module 1355 may output a sound signal to the outside of the electronic device 1301. The sound output module 1355 may include, for example, a speaker or a receiver. The speaker may be used for general purposes, such as playing multimedia or playing a recording. The receiver may be used to receive an incoming call. According to an embodiment, the receiver may be implemented separately from the speaker or as a part of the speaker.

The display module 1360 may visually provide information to the outside (e.g., a user) of the electronic device 1301. The display module 1360 may include, for example, a display, a hologram device, or a projector, and a control circuitry for controlling a corresponding one of the display, the hologram device, and the projector. According to an embodiment, the display module 1360 may include a touch sensor adapted to sense a touch, or a pressure sensor adapted to measure an intensity of a force of the touch.

The audio module 1370 may convert sound into an electric signal or vice versa. According to an embodiment, the audio module 1370 may obtain the sound via the input module 1350 or output the sound via the sound output module 1355 or an external electronic device (e.g., the electronic device 1302, such as a speaker or headphones) directly or wirelessly connected to the electronic device 1301.

The sensor module 1376 may detect an operational state (e.g., power or temperature) of the electronic device 1301 or an environmental state (e.g., a state of a user) external to the electronic device 1301 and generate an electric signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used by the electronic device 1301 to couple with an external electronic device (e.g., the electronic device 1302) directly (e.g., by wire) or wirelessly. According to an embodiment, the interface 1377 may include, for example, a high-definition multimedia interface (HDMI), a universal serial bus (USB) interface, a secure digital (SD) card interface, or an audio interface.

The connecting terminal 1378 may include a connector via which the electronic device 1301 may physically connect to an external electronic device (e.g., the electronic device 1302). According to an embodiment, the connecting terminal 1378 may include, for example, an HDMI connector, a USB connector, an SD card connector, or an audio connector (e.g., a headphones connector).

The haptic module 1379 may convert an electric signal into a mechanical stimulus (e.g., a vibration or a movement) or an electrical stimulus, which may be recognized by a user via their tactile sensation or kinesthetic sensation. According to an embodiment, the haptic module 1379 may include, for example, a motor, a piezoelectric element, or an electric stimulator.

The camera module 1380 may capture a still image and moving images. According to an embodiment, the camera module 1380 may include one or more lenses, image sensors, image signal processors (ISPs), and flashes.

The power management module 1388 may manage power supplied to the electronic device 1301. According to an embodiment, the power management module 1388 may be implemented as, for example, at least a part of a power management integrated circuit (PMIC).

The battery 1389 may supply power to at least one component of the electronic device 1301. According to an embodiment, the battery 1389 may include, for example, a primary cell, which is not rechargeable, a secondary cell, which is rechargeable, or a fuel cell.

The communication module 1390 may support establishing a direct (e.g., wired) communication channel or a wireless communication channel between the electronic device 1301 and an external electronic device (e.g., the electronic device 1302, the electronic device 1304, or the server 1308) and performing communication via the established communication channel. The communication module 1390 may include one or more CPs that are operable independently from the processor 1320 (e.g., an AP) and that support direct (e.g., wired) communication or wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device, for example, the electronic device 1304, via the first network 1398 (e.g., a short-range communication network, such as Bluetooth™, wireless-fidelity (Wi-Fi) direct, or infrared data association (IrDA)) or the second network 1399 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the SIM 1396.

The wireless communication module 1392 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1392 may support a high-frequency band (e.g., a millimeter wave (mmWave) band) to achieve, e.g., a high data transmission rate. The wireless communication module 1392 may support various technologies for securing performance on a high-frequency band, such as, e.g., beamforming, massive multiple-input and multiple-output (MIMO), full dimensional MIMO (FD-MIMO), an antenna array, analog beamforming, or a large-scale antenna. The wireless communication module 1392 may support various requirements specified in the electronic device 1301, an external electronic device (e.g., the electronic device 1304), or a network system (e.g., the second network 1399). According to an embodiment, the wireless communication module 1392 may support a peak data rate (e.g., 20 Gbps or more) for implementing eMBB, loss coverage (e.g., 164 decibels (dB) or less) for implementing mMTC, or U-plane latency (e.g., 0.5 ms or less for each of downlink (DL) and uplink (UL), or a round trip of 1 ms or less) for implementing URLLC.

The antenna module 1397 may transmit or receive a signal or power to or from the outside (e.g., an external electronic device) of the electronic device 1301. According to an embodiment, the antenna module 1397 may include an antenna including a radiating element including a conductive material or a conductive pattern formed in or on a substrate (e.g., a printed circuit board (PCB)). According to an embodiment, the antenna module 1397 may include a plurality of antennas (e.g., an antenna array). In such a case, at least one antenna appropriate for a communication scheme used in a communication network, such as the first network 1398 or the second network 1399, may be selected by, for example, the communication module 1390 from the plurality of antennas. The signal or power may be transmitted or received between the communication module 1390 and the external electronic device via the at least one selected antenna. According to an embodiment, another component (e.g., a radio frequency integrated circuit (RFIC)) other than the radiating element may be additionally formed as a part of the antenna module 1397.

According to an embodiment, the antenna module 1397 may form a mmWave antenna module. According to an embodiment, the mmWave antenna module may include a PCB, an RFIC on a first surface (e.g., a bottom surface) of the PCB, or adjacent to the first surface of the PCB and capable of supporting a designated high-frequency band (e.g., a mmWave band), and a plurality of antennas (e.g., an antenna array) disposed on a second surface (e.g., a top or a side surface) of the PCB, or adjacent to the second surface of the PCB and capable of transmitting or receiving signals in the designated high-frequency band.

At least some of the above-described components may be coupled mutually and exchange signals (e.g., commands or data) therebetween via an inter-peripheral communication scheme (e.g., a bus, general-purpose input and output (GPIO), serial peripheral interface (SPI), or mobile industry processor interface (MIPI)).

According to an embodiment, commands or data may be transmitted or received between the electronic device 1301 and the external electronic device (e.g., the electronic device 1304) via the server 1308 coupled with the second network 1399. Each of the external electronic devices (e.g., the electronic device 1302 and 1304) may be a device of the same type as or a different type from the electronic device 1301. According to an embodiment, some or all the operations to be executed by the electronic device 1301 may be executed by one or more of the external electronic devices (e.g., the electronic devices 1302 and 1304, and the server 1308). For example, if the electronic device 1301 needs to perform a function or a service automatically, or in response to a request from a user or another device, the electronic device 1301, instead of, or in addition to, executing the function or the service, may request one or more external electronic devices to perform at least a part of the function or service. The one or more external electronic devices receiving the request may perform the at least part of the function or service requested, or an additional function or an additional service related to the request, and may transfer a result of the performance to the electronic device 1301. The electronic device 1301 may provide the result, with or without further processing of the result, as at least a part of a response to the request. To that end, cloud computing, distributed computing, mobile edge computing (MEC), or client-server computing technology may be used, for example. The electronic device 1301 may provide ultra-low latency services using, e.g., distributed computing or MEC. In an embodiment, the external electronic device (e.g., the electronic device 1304) may include an Internet-of-things (IoT) device. The server 1308 may be an intelligent server using machine learning and/or a neural network. According to an embodiment, the external electronic device (e.g., the electronic device 1304) or the server 1308 may be included in the second network 1399. The electronic device 1301 may be applied to intelligent services (e.g., a smart home, a smart city, a smart car, or healthcare) based on 5G communication technology or IoT-related technology.

According to an embodiment described herein, an electronic device may be a device of one of various types. The electronic device may include, as non-limiting examples, a portable communication device (e.g., a smartphone, etc.), a computing device, a portable multimedia device, a portable medical device, a camera, a wearable device, or a home appliance. However, the electronic device is not limited to the examples described above.

It should be appreciated that an embodiment of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things unless the relevant context clearly indicates otherwise. As used herein, "A or B," "at least one of A and B," "at least one of A or B," "A, B, or C," "at least one of A, B, and C," and "A, B, or C," each of which may include any one of the items listed together in the corresponding one of the phrases, or all possible combinations thereof. Terms such as "first," "second," or "initial" or "next" or "subsequent" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., by wire), wirelessly, or via a third element.

As used in connection with an embodiment of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in the form of an application-specific integrated circuit (ASIC).

An embodiment set forth herein may be implemented as software (e.g., the program 1340) including one or more instructions that are stored in a storage medium (e.g., the internal memory 1336 or the external memory 1338) that is readable by a machine (e.g., the electronic device 1301). For example, a processor (e.g., the processor 1320) of the machine (e.g., the electronic device 1301) may invoke at least one of the one or more instructions stored in the storage medium and execute it. This allows the machine to be operated to perform at least one function according to the at least one instruction invoked. The one or more instructions may include code generated by a complier or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™) or between two user devices (e.g., smart phones) directly. If distributed online, at least part of the computer program product may be temporarily generated or at least temporarily stored in the machine-readable storage medium, such as a memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components or operations may be omitted, or one or more other components or operations may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

According to an embodiment, an electronic device (e.g., the STA 301 of FIG. 3, the non-AP MLD 601 of FIG. 4, or the electronic device 1301 of FIG. 13) may include: at least one wireless communication module (e.g., the wireless communication module 810 of FIG. 8 or the wireless communication module 1392 of FIG. 13) configured to transmit and receive a wireless signal; at least one processor (e.g., the processor 820 of FIG. 8 or the processor 1320 of FIG. 13) operatively connected to the wireless communication module 810; and a memory (e.g., the memory 830 of FIG. 8 or the memory 1330 of FIG. 13) electrically connected to the processor 820 and configured to store instructions executable by the processor 820. In response to the instructions being executed by the processor 820, the processor 820 may receive at least one beacon signal comprising information about restricted target wake time (R-TWT) service period (SP) of each link of multiple links. The processor 820 may determine at least one link among the multiple links, based on the at least one beacon signal. The processor 820 may transmit and receive data via the determined at least one link. An R-TWT SP may be dynamically configured based on a quality of service (QoS) requirement associated with a type of service to be executed in a peripheral device (e.g., the STA 301 of FIG. 3, the non-AP MLD 601 of FIG. 4, or the electronic device 1301, 1302, or 1304 of FIG. 13) located around an access point that communicates with the electronic device.

According to an embodiment, the R-TWT SP has a different value for the each link to satisfy the QoS requirement associated with the type of the service to be executed in the peripheral device (e.g., the STA 301 of FIG. 3, the non-AP MLD 601 of FIG. 4, or the electronic device 1301, 1302, or 1304 of FIG. 13).

According to an embodiment, the processor 820 may determine the at least one link among the multiple links by considering the information about the R-TWT SP and the QoS requirement of a service to be executed in the electronic device 601.

According to an embodiment, the information about the R-TWT SP may include at least one of start time information of the R-TWT SP, duration information of the R-TWT SP, or interval information of the R-TWT SP.

According to an embodiment, the QoS requirement may include at least one of a latency requirement of the service to be executed in the electronic device or a throughput requirement of the service to be executed in the electronic device.

According to an embodiment, the processor 820 may determine, among the multiple links, the at least one link having an R-TWT interval that is less than a latency requirement of the service to be executed in the electronic device.

According to an embodiment, the processor 820 may determine, among the multiple links, the at least one link having an R-TWT duration that is sufficiently great to exchange data to be generated in response to a throughput requirement of the service to be executed in the electronic device.

According to an embodiment, the processor 820 may determine a plurality of links, respectively corresponding to a plurality of services, among the multiple links. The each of the plurality of links satisfies QoS requirements of the respective one of the plurality of services.

According to an embodiment, the processor 820 may obtain an aggregate QoS requirement by integrating QoS requirements of a plurality of services. The processor 820 may determine the at least one link that satisfies the aggregate QoS requirement among the multiple links.

According to an embodiment, the processor 820 may request membership for the at least one link. The processor 820 may transmit and receive data through at least one link based on a result of requesting the membership.

According to an embodiment, the at least one beacon signal (e.g., the beacon signal 610 of FIG. 6) may include information about the R-TWT SP of a link, TID information mapped to the link, and direction information of the link.

According to an embodiment, for each link included in the multiple links, the processor 820 may compare the information about the R-TWT SP and a QoS requirement of a service to be executed in the electronic device. For each link included in the multiple links, the processor 820 may compare the TID information mapped to the link and TID information of traffic to be generated for the service to be executed in the electronic device. For each link included in the multiple links, the processor 820 may compare the direction information of the link and direction information of the traffic.

According to an embodiment, a method of operating an electronic device (e.g., the STA 301 of FIG. 3, the non-AP MLD 601 of FIG. 4, or the electronic device 1301 of FIG. 13) may include: receiving at least one beacon signal comprising information about restricted target wake time (R-TWT) service period (SP) of each link of multiple link. The method of operating the electronic device 601 may include determining at least one link among the multiple links based on the at least one beacon signal. The method of operating the electronic device 601 may include transmitting and receiving data via the determined at least one link. the R-TWT SP is dynamically configured based on a quality of service (QoS) requirement associated with a type of service to be executed in a peripheral device e (e.g., the STA 301 of FIG. 3, the non-AP MLD 601 of FIG. 4, or the electronic device 1301, 1302, or 1340 of FIG. 13) located around an access point that communicates with the electronic device 601.

According to an embodiment, the R-TWT SP has a different value for the each link to satisfy the QoS requirement associated with the type of the service to be executed in the peripheral device (e.g., the STA 301 of FIG. 3, the non-AP MLD 601 of FIG. 4, or the electronic device 1301, 1302, or 1304 of FIG. 13).

According to an embodiment, the determining may determining the at least one link among the multiple links by considering the information about the R-TWT SP and the QoS requirement of a service to be executed in the electronic device 601.

According to an embodiment, the information about the R-TWT SP may include at least one of start time information of the R-TWT SP, duration information of the R-TWT SP, or interval information of the R-TWT SP.

According to an embodiment, the QoS requirement may include at least one of a latency requirement of the service to be executed in the electronic device or a throughput requirement of the service to be executed in the electronic device 601.

According to an embodiment, the determining may include determining, among the multiple links, the at least one link having an R-TWT interval that is less than the latency requirement of the service to be executed in the electronic device 601

According to an embodiment, the determining may include determining, among the multiple links, the at least one link having an R-TWT duration that is sufficiently great to exchange data to be generated in response to a throughput requirement of the service to be executed in the electronic device 601.

According to an embodiment, the at least one beacon signal may include information about the R-TWT SP of a link, TID information mapped to the link, and direction information of the link.

What is claimed is:

1. An electronic device, comprising:
   at least one wireless communication module configured to transmit and receive a wireless signal;
   at least one processor operatively connected to the wireless communication module; and
   a memory electrically connected to the processor and configured to store instructions,
   the instructions, when executed by the at least one processor, cause the electronic device to:
   receive at least one beacon signal comprising information about restricted target wake time (R-TWT) service period (SP) of each link of multiple links, wherein each link of the multiple links is associated with a respective one of a plurality of services,
   determine at least one link corresponding to a type of service to be executed in the electronic device among the multiple links, based on the at least one beacon signal; and
   transmit and receive data via the determined at least one link,
   wherein the R-TWT SP of each link of the multiple links is dynamically configured based on a quality of service (QOS) requirement associated with a type of service to be executed in a peripheral device located around an access point that communicates with the electronic device.

2. The electronic device of claim 1, wherein the R-TWT SP has a different value for each link of the multiple links to satisfy the QoS requirement associated with the type of the service to be executed in the peripheral device.

3. The electronic device of claim 1, wherein the instructions, when executed by the at least one processor, cause the electronic device to:
   determine the at least one link among the multiple links by considering the information about the R-TWT SP and the QOS requirement of the service to be executed in the electronic device.

4. The electronic device of claim 3, wherein the information about the R-TWT SP comprises at least one of:
   start time information of the R-TWT SP, duration information of the R-TWT SP, or interval information of the R-TWT SP.

5. The electronic device of claim 3, wherein the QoS requirement comprises at least one of:
   a latency requirement of the service to be executed in the electronic device or a throughput requirement of the service to be executed in the electronic device.

6. The electronic device of claim 3, wherein the instructions, when executed by the at least one processor, cause the electronic device to:

determine, among the multiple links, the at least one link having an R-TWT interval that is less than a latency requirement of the service to be executed in the electronic device.

7. The electronic device of claim 3, wherein the instructions, when executed by the at least one processor, cause the electronic device to:
   determine, among the multiple links, the at least one link having an R-TWT duration that is sufficiently great to exchange data to be generated in response to a throughput requirement of the service to be executed in the electronic device.

8. The electronic device of claim 3, wherein each of the multiple links satisfies QOS requirements of the respective one of the plurality of services.

9. The electronic device of claim 3, wherein the instructions, when executed by the at least one processor, cause the electronic device to:
   obtain an aggregate QoS requirement by integrating QoS requirements of the plurality of services; and
   determine the at least one link that satisfies the aggregate QOS requirement among the multiple links.

10. The electronic device of claim 1, wherein the instructions, when executed by the at least one processor, cause the electronic device to:
    request membership for the at least one link; and
    transmit and receive data through the at least one link, based on a result of requesting the membership.

11. The electronic device of claim 1, wherein the at least one beacon signal comprises:
    information about the R-TWT SP of a link, traffic identifier (TID) information mapped to the link, and direction information of the link.

12. The electronic device of claim 11, wherein the instructions, when executed by the at least one processor, cause the electronic device to:
    for the each link of the multiple links,
    compare the information about the R-TWT SP and a QOS requirement of the service to be executed in the electronic device;
    compare the TID information mapped to the link and TID information of traffic to be generated for the service to be executed in the electronic device; and
    compare the direction information of the link and direction information of the traffic.

13. A method of operating an electronic device, the method comprising:
    receiving at least one beacon signal comprising information about restricted target wake time (R-TWT) service period (SP) of each link of multiple links, wherein each link of the multiple links is associated with a respective one of a plurality of services;
    determining at least one link corresponding to a type of service to be executed in the electronic device among the multiple links based on the at least one beacon signal; and
    transmitting and receiving data via the determined at least one link,
    wherein the R-TWT SP of each link of the multiple links is dynamically configured based on a quality of service (QOS) requirement associated with a type of service to be executed in a peripheral device located around an access point that communicates with the electronic device.

14. The method of claim 13, wherein the R-TWT SP has a different value for each link of the multiple links to satisfy the QOS requirement associated with the type of the service to be executed in the peripheral device.

15. The method of claim 14, wherein the information about the R-TWT SP comprises at least one of:

start time information of the R-TWT SP, duration information of the R-TWT SP, or interval information of the R-TWT SP.

16. The method of claim 14, wherein the QoS requirement comprises at least one of:

a latency requirement of the service to be executed in the electronic device or a throughput requirement of the service to be executed in the electronic device.

17. The method of claim 14, wherein the determining comprises:

determining, among the multiple links, the at least one link having an R-TWT interval that is less than the latency requirement of the service to be executed in the electronic device.

18. The method of claim 14, wherein the determining comprises:

determining, among the multiple links, the at least one link having an R-TWT duration that is sufficiently great to exchange data to be generated in response to a throughput requirement of the service to be executed in the electronic device.

19. The method of claim 13, wherein the determining comprises:

determining the at least one link among the multiple links by considering the information about the R-TWT SP and the QoS requirement of the service to be executed in the electronic device.

20. The method of claim 13, wherein the at least one beacon signal comprises:

information about the R-TWT SP of the link, traffic identifier (TID) information mapped to the link, and direction information of the link.

* * * * *